(12) United States Patent
Wilkes

(10) Patent No.: US 7,383,789 B2
(45) Date of Patent: Jun. 10, 2008

(54) PORTABLE PET BOOSTER SEAT

(76) Inventor: Robert Leonard Wilkes, 7 Wembley Avenue, Unionville, Ontario (CA) L3R 1Z1

( * ) Notice: Subject to any disclaimer, the term of this patent is extended or adjusted under 35 U.S.C. 154(b) by 0 days.

(21) Appl. No.: 11/457,604

(22) Filed: Jul. 14, 2006

(65) Prior Publication Data
US 2008/0011234 A1 Jan. 17, 2008

(51) Int. Cl.
*A01K 15/04* (2006.01)
(52) U.S. Cl. .............. 119/771; 119/28.5; 5/94; 297/250.1
(58) Field of Classification Search ........ 119/771, 119/769, 482, 496, 497, 28.5; 5/94; 297/250.1, 297/253, 464; D6/333, 356; D30/118
See application file for complete search history.

(56) References Cited

U.S. PATENT DOCUMENTS

| | | | | |
|---|---|---|---|---|
| 3,619,825 | A | * | 11/1971 | Taub et al. ............ 5/94 |
| D245,716 | S | | 9/1977 | Russo |
| 4,366,587 | A | * | 1/1983 | Takada ............ 5/94 |
| D268,630 | S | | 4/1983 | Wilson |
| 4,512,286 | A | | 4/1985 | Rux |
| 4,583,253 | A | * | 4/1986 | Hall ............ 5/94 |
| D283,855 | S | | 5/1986 | Kujawski |
| 4,597,359 | A | | 7/1986 | Moorman |
| 4,889,388 | A | * | 12/1989 | Hime ............ 297/464 |
| 5,005,526 | A | * | 4/1991 | Parker ............ 119/751 |
| 5,044,321 | A | | 9/1991 | Selph |
| D324,611 | S | | 3/1992 | Sedlack |
| 5,133,294 | A | | 7/1992 | Reid |
| 5,275,464 | A | | 1/1994 | Eichhorn et al. |
| 5,277,148 | A | | 1/1994 | Rossignol et al. |
| D348,783 | S | | 7/1994 | Young |
| 5,479,892 | A | | 1/1996 | Edwards |
| 5,487,361 | A | * | 1/1996 | Dean ............ 119/28.5 |
| 5,551,373 | A | | 9/1996 | O'Donnell |
| 5,685,258 | A | | 11/1997 | Fricano |

(Continued)

FOREIGN PATENT DOCUMENTS

WO    WO 03/084315 A2    *    10/2003

OTHER PUBLICATIONS

"Car-Safety.org Information on LATCH (Lower Anchors and Tethers for Children)": www.car-safety.org/ltach.html; 2006.

*Primary Examiner*—Yvonne R. Abbott
(74) *Attorney, Agent, or Firm*—Gowan Intellectual Property

(57) ABSTRACT

A portable pet booster seat apparatus is provided which is adapted to be fitted securely on the seat of a vehicle. The booster seat includes a base, a back, a front and side portions that are all interconnected. A strap is provided that extends across the back and/or base of the includes a base portion which includes attachment fittings that are adapted to be fitted to the attachment brackets of a LATCH infant seat device. The booster seat apparatus may also include an additional strap for use in attaching the device to vehicle seats not fitted with the LATCH device. The portable pet booster seat apparatus may also include a removable and replaceable cover assembly. The booster seat apparatus is attached to the seat at or near the base of the booster seat, and thus has improved stability. It can also be more firmly attached to the vehicle seat and is less likely to move or shift during use.

13 Claims, 3 Drawing Sheets

U.S. PATENT DOCUMENTS

| | | | |
|---|---|---|---|
| 5,718,191 A | * | 2/1998 | O'Donnell .................. 119/771 |
| 5,785,003 A | | 7/1998 | Jacobson et al. |
| 6,079,370 A | | 6/2000 | Al-Birmani et al. |
| D461,966 S | | 8/2002 | Reece |
| 6,588,365 B2 | | 7/2003 | Best Wright |
| 6,863,345 B2 | * | 3/2005 | Kain ..................... 297/256.16 |
| 2005/0168026 A1 | * | 8/2005 | Kau ....................... 297/256.16 |
| 2005/0284415 A1 | * | 12/2005 | O'Donnell .................. 119/771 |

* cited by examiner

PORTABLE PET BOOSTER SEAT

FIELD OF THE INVENTION

The present invention relates to the field of portable seats and, more particularly, to portable seats especially adapted for use in a vehicle for boosting the vertical position of a pet.

BACKGROUND OF THE INVENTION

Just as with people, when pets are being transported in a motor vehicle, the pets often prefer to look out of a window. For relatively large pets, such large pets can sit on a seat in a motor vehicle and easily look out of a window. For relatively small pets, such as, for example, those pets with a weight of about 10 kg. or less, and including dogs, cats or the like, it may not be possible for the pet to sit on the vehicle seat and be able to look out of a window.

Also, there is interest in providing a system to confine an animal in a vehicle in order to keep the animal in a certain area (e.g. to prevent the animal from moving to certain areas of the vehicle). Vehicle restraint systems designed for humans are at best ineffective in confining a pet. Accordingly, there is a need for an improved system and method for confining pets on a vehicle seat during transport.

Additionally, there is a need to restrain pets from free movement during an impact or sudden stop. However, the restraints should not be too confining because a rigid restraint system can transmit deceleration forces directly to the pet, potentially causing additional injury. Thus, a pet restraint system needs to provide sufficient restraint while providing a resilient and force absorbing system to minimize the potential for injury.

In the prior art, a pet carrier that is used in a motor vehicle is disclosed in U.S. Pat. No. 5,551,373 which provides a pet booster seat on which a pet can sit, and which is held in place by the seat belt of the vehicle passing through the booster seat assembly between the seat section, and back section. However, the seat requires the use of a seat belt which is not always convenient, and requires an opening between the seat section and the back which can result in a weakening of the attachment section. This weakening of the seat section can allow the back of the booster seat to become excessively flexible over time, so that the booster seat can be inadvertently released from the seat belt in the event of a significant deceleration force, such as a vehicle accident.

Further, this arrangement also allows the seat to be easily moved and possibly tipped by the normal activities of the pet since the seat or shoulder belts are not normally in a taut position until they are activated during a vehicle collision.

Further, this system requires use of the seat belt which can provide premature wear and tear on the belt, as well as the potential for soiling or accumulation of pet hair or the like, on the belt.

U.S. Pat. No. 6,588,365 provides a similar device which also relies on the use of a seat belt for attachment to the vehicle.

U.S. Pat. No. 5,044,321 discloses a restraining pouch that is suspended from two independent side-by-side seats. The restraining pouch is elevated in a vertical direction so that, in the elevated position, the pet is able to see out of a window in the vehicle. However, this device is not practical in that it prevents the pet from exercising any mobility. Furthermore, another feature of this restraining device is that it requires that the restraining device be suspended from two adjacent independent seat structures. Such a suspension mechanism would not be possible for a motor vehicle that includes bench seats.

Other devices are know which rely on additional straps to hold a pet "console" seat in position on a console which is located between two of the vehicle seats. However, this type of device is not normally used for a pet booster seat since this space is not always available in a vehicle.

As such, in this respect, it would be desirable if a pet booster device were provided that is readily usable in motor vehicles that have either bench or "bucket" seats, by resting on these seats.

U.S. Pat. No. 5,277,148 discloses a wearable pet enclosure which is can be hung from a motor vehicle seat. However, it is not used as a booster seat in a motor vehicle. Further, U.S. Pat. No. D461,966 provides a booster seat with a pet restraint, but the method of attachment to the vehicle is not clearly visible. However, from the drawings, it seems clear that use of a seat belt is required.

Human infants and toddlers are also commonly provided with some sort of booster seat to permit them to see out of vehicle windows. The following U.S. patents disclose some booster seats used for infants and toddlers in motor vehicles: U.S. Pat. No. 5,275,464; Pat. No. Des. 268,630; Pat. No. Des. 283,855; Pat. No. Des. 324,611; and Pat. No. Des. 348,783.

In current model vehicles, it is common to provide infant and toddler seat mounting brackets that typically are directly attached to the vehicle frame. Originally, this attachment point was a "tether" point for attaching a tether to the top of a child's seat which was primarily held in place using the vehicle's seat belts. More recently, current vehicles are commonly supplied with a LATCH (Lower Anchors and Tethers for Children) system attachment point which typically provides a "D-ring" connected to the frame, on each side of a vehicle seat. Modern infant seats are provided with attachment points for attaching the seat to the LATCH system attachment points, and for optional use of the tether point.

It is noted though, that one particular characteristic of the human booster seats is the provision at the front of each seat for the legs of the infant or child to allow child's legs to hang over the front of the seat. Such a feature may be useful for a human infant or toddler. However, for a booster seat that is used for a pet, such a provision is undesirable. For example, if a pet is seated on a booster support, the pet's front legs could move off of the top surface of the booster support during a sudden deceleration. The pet might then fall out of the booster seat. With this in mind, it would be desirable if a pet booster device had a feature which prevents a pet's front legs from moving off of the top surface of a booster support.

Still other features would be desirable in a portable pet booster seat apparatus. For example, motor vehicles have seat belts and shoulder harnesses for restraint of the occupant in the event of an accident or collision. In a similar manner, it would be desirable if a portable pet booster seat apparatus were provided that included, or which was adaptable for use with a pet restraint system.

Additionally, when traveling with a pet, the pet may not be able to sleep in an unfamiliar room or environment. To avoid this problem, it would be desirable if a pet booster device were provided that can also serve as a portable pet bed.

Also, since any device that is often used for supporting a pet is subject to the accumulation of pet hair and other debris, it would be desirable if a pet booster device had an easily removable and easily laundered cover.

Thus, while the foregoing body of prior art indicates that it is well known to use a portable pet booster device, the prior art described above does not teach or suggest a preferred arrangement wherein a more rigid portable pet booster seat apparatus is used without required used of the vehicle's seat or shoulder belts. In the preferred arrangement, the booster seat of the present invention is also firmly supported and held in place, and therefore is resistant to inadvertent movement or tipping.

Also, it would be preferred that the portable pet booster seat of the present invention provide some or all of the following combination of additional desirable features, namely: (1) boost a pet in a motor vehicle to allow them to see out of the vehicle windows, in a safe and secure manner, without substantially immobilizing the pet; (2) be readily usable in motor vehicles that have bench seats or bucket seats; (3) does not employ suspension straps for maintaining the pet in an elevated position above the vehicle seat; (4) prevents a pet's front legs from moving off of the top surface of a booster support; (5) has, or can be used in conjunction with, a feature to provide a seat belt or shoulder harness restraint on the movement of the pet; (6) can also serve as a portable pet bed; (7) has an easily removable and easily laundered cover; and (8) is less likely to cause damage to the seat belt or seat belt structure of the vehicle.

Further, it would be advantageous to provide a new and improved portable pet booster seat which may be easily and efficiently manufactured and marketed, and which is of durable and reliable construction. Still further, it would be advantageous to provide a new and improved portable pet booster seat apparatus which is susceptible of a low cost of manufacture with regard to both materials and labour, and which accordingly is then susceptible of low prices of sale to the consuming public, thereby making such portable pet booster seat apparatus available to the buying public.

The problems inherent in the prior art portable pet booster seats are at least partially ameliorated, and the goals and objectives herein stated, are at least partially or fully achieved, by the unique portable pet booster seat apparatus of the present invention, as described and claimed herein, and as will be made apparent from the following description thereof.

SUMMARY OF THE INVENTION

The advantages and/or improvements set out hereinabove, as well as the achievement of other objects and goals inherent thereto, are at least partially or fully provided by the pet booster seat of the present invention, as set out hereinbelow.

Accordingly, in one aspect, the present invention provides a portable pet booster seat apparatus, comprising:

a base portion having which includes a top surface and a support portion;

a back wall portion connected to said base portion at a back peripheral portion of said base portion, and wherein said back wall portion projects upward above said top surface of said base portion;

a side and front wall portions connected respectively to said base portion at side and front peripheral portion of said base portion, wherein said side and front wall portions projects upward above said top surface of said base portion, and wherein said side portions are connected to both said back portion and said front portion;

a seat that rests on said base portion, between said back, front and side walls; and a seat attachment means comprising strap ends ending from, or near, said back peripheral portion at the connection of said back portion and said base portion, in the vicinity of said side walls, and attaching devices with are adapted to be connected to a vehicle-mounted child seat attachment bracket located at the base of a vehicle seat back, and which, preferably is a LATCH attachment bracket.

DETAILED DESCRIPTION OF THE INVENTION

In the present application, the term "LATCH attachment bracket" refers to the bracket which is provided in most late model vehicles. Typically, this is a D-shaped ring which is firmly attached to the vehicle frame, and is commonly found on the outer, rear seats of a vehicle in the area of the juncture of the seat base and seat back. The present application is primarily directed to the use of the LATCH attachment brackets. However, the skilled artisan will be aware that other similar attachment brackets, provided for other reasons, might be equally useable. Accordingly, while the present application is described with particular reference to the LATCH attachment bracket, the skilled artisan would be aware that the present application can be equally applicable in other applications.

In particular, it is to be noted that the LATCH attachment bracket provides a firm attachment point that is located at the base of the vehicle seat back. As such, the strap ends of the portable pet booster seat of the present invention are preferably located at the lower rear corners of the booster seat in the area where the back portion, the base portion and the side portion all meet. In this fashion, the support straps holding the booster seat in place, are located at its base. This arrangement aids in preventing accidentally tipping of the booster seat.

The strap ends extending from each side of the booster seat are preferably the ends of a single strap that extends across the back portion of the booster seat. These ends preferably protrude from the side of the booster seat in the vicinity of the lower rear corner. Further, the strap ends each preferably have a length adjustment feature which allows the length of the strap ends to be adjusted. In this fashion, the strap ends on each side of the booster seat can be connected to the LATCH bracket, adjusted and then drawn taut to the point where little or no excess movement of the booster seat is possible once the strap ends have been connected to the LATCH attachment bracket.

The attachment means for attaching to the LATCH attachment bracket is preferably located at or near the end of each strap extending from the booster seat. The strap attachment means can be any of a variety of devices, but preferably is a spring-loaded clip or hook, such as a trigger snap hook of the type found, or example, on pet leashes, or the like.

With this system, the use of a seat belt to hold a pet booster seat in place can be avoided.

BRIEF DESCRIPTION OF THE DRAWINGS

Embodiments of this invention will now be described by way of example only in association with the accompanying drawings in which.

DETAILED DESCRIPTION OF THE PREFERRED EMBODIMENTS

Figure 1:
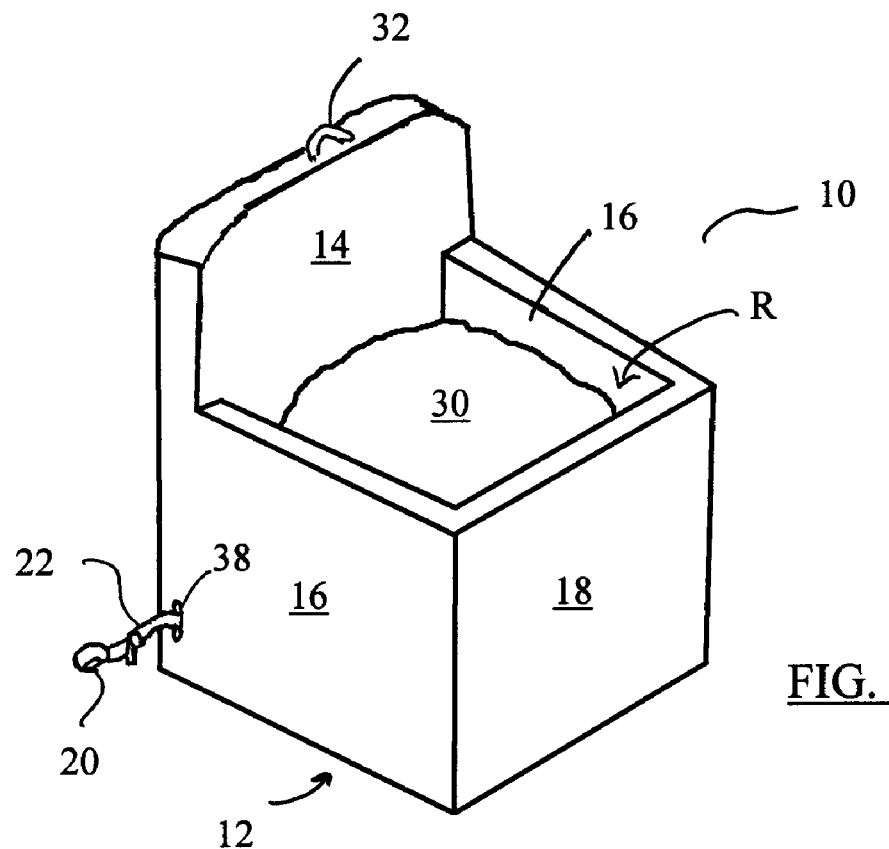
FIG. 1 is a perspective view of a pet booster seat according to the present invention.

The novel features which are believed to be characteristic of the present invention, as to its structure, organization, use and method of operation, together with further objectives and advantages thereof, will be better understood from the following drawings in which a presently preferred embodiment of the invention will now be illustrated by way of example only. In the drawings, like reference numerals depict like elements.

It is expressly understood, however, that the drawings are for the purpose of illustration and description only and are not intended as a definition of the limits of the invention.

Figure 2:
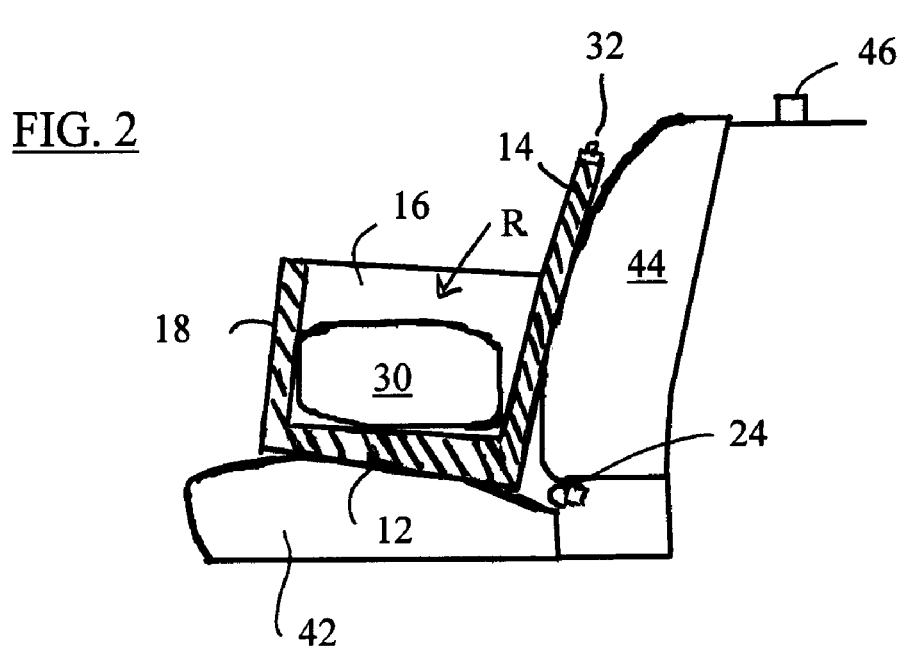
FIG. 2 is a cross-sectional side view of the pet booster seat of FIG. 1 in position on a vehicle seat.

Referring to FIGS. 1 and 2, an exemplary embodiment of the portable pet booster seat apparatus of the invention is shown and is generally designated by reference numeral 10. Booster seat 10 has a base portion 12, to which a back portion 14, side portions 16, and a front portion 18 are connected in order to form a box-like structure. Back portion 14 extends above the height of side portions 16 or front portion 18. At the rear lower corner of seat 10 are straps ends 22 having trigger snap hooks (or buckles) 20 that are adapted to be connected to a D-ring 24 of a LATCH attachment bracket.

Base portion 12 is designed to rest on the seat 42 of the vehicle. For a better fit on the seat, base portion 12 is thicker at its rear section, in order to account for the slope found in most car seats. Base portion 12 has an upper surface, a lower surface, and 4 edges. However, base 12 could have a different shape such as circular, in which case one continuous edge would be provided, or hexagon, in which case 6 edges would be provided. Depending on the number of edges on base 12, the number of side, back or front portions can be adjusted accordingly.

In the preferred embodiment, base 12 has 4 edges, and therefore, seat 10 has a single back portion 14, a single front portion 18, and 2 opposed side portions 16. With this configuration, a box-like inner structure results. Within the box-like structure of seat 10, is an optional removable seat section 30, which is sized so as to fit snugly with the box-like structure, provides a more comfortable seat for the pet, and acts to raise the pet resting on seat section 30 to a height where they can see out of the vehicle window (not shown). It will be understood that the top surface of base 12 can act as the seat section. Alternatively seat section 30 can be permanently affixed to base 12. Preferably, though, seat section 30 is a removable cushion that can be removed for cleaning, or replacement, as needed. Seat section 30 also preferably is provided with a removable cover that can be removed for cleaning or replacement.

It is to be noted that seat section 30 preferably does not extend above the top of side portions 16 or front portion 18 and thus, a recessed section "R" is provided on which the pet can sit. Since the recessed section is located below the top edges of side portions 16 or and front portions 18, the possibility of a pet slipping off of seat section 30 is reduced.

The booster seat 10 can be any suitable size that would be consistent with the goal of providing a booster seat that can be placed on a vehicle seat and that is able to elevate a small animal (e.g. below 10 kg) to a height where in can look outside a vehicle window. Preferably, booster seat 10 is sized such that recess "R" has a surface area of over 400 sq. cm, and more preferably, a surface area of over 900 sq. cm. Most preferably, recess "R" has a surface area of over 1600 sq. cm.

Back portion 14 is preferably longer in length than either side portions 16 or front portion 18, so that it extends above these sections. Back portion 14 is adapted to rest against the back 44 of vehicle seat 42, and can be fitted with handle holds, or handles (not shown) to facilitate carrying of booster seat 10 when removed from the vehicle.

In this embodiment, booster seat 10 is also provided with ring 32 at the top of back portion 14. In this embodiment, ring 32 is a D-ring and is adapted to receive a short pet leash or harness (not shown) which can be used to hold the pet on, or in the vicinity of booster seat 10. This mechanism can also be used to keep the pet attached to booster seat 10 in case of an accident, or in case of a sudden movement or deceleration.

Ring 32 can be located along the sides of back portion 14, or in some other position, but preferably is centrally located at the top of back portion 14. Ring 32 might be a metal ring, or some other type of device, or can simply be a fabric cord attached to the back portion. Ring 32 might also be used by passing a leash or harness through ring 32 to connect to a typical seat belt assembly, or to a top tether anchor 46 commonly provided at the top of the vehicle seat back 44. Alternatively, ring 32 can be used with a second strap to simply connect the top of back portion 14 directly to the top tether of the vehicle. Various options can be provided in which either the pet and/or the top of the booster seat at also connected to either the vehicle seat belt and/or the vehicle top tether anchor.

Each of base portion 12, back portion 14, side portions 16 and front portions 18 can be made of any suitable material. This includes materials such as wood, metal, ceramic, plastic or the like. In the most preferred embodiment, base portion 12, back portion 14, side portions 16 and front portions 18 are all made of a foam, and in particular a polyurethane-based, flexible foam having a constant thickness of between 2.5 and 7.5 cm, and most preferably 5.0 cm. All of the components can be glued together to form a light-weight structure that can be easily lifted and moved.

The various straps can be produced from any suitable material, however, a particularly preferred material is a heavy duty nylon strap.

The various components are preferably glued along their length where they contact an adjacent component so as to provide maximum strength to the resultant join. Further, the various components are preferably sized so that it overlaps and is connectable to adjacent components. In particular, no gaps need to be left of the passage of seat belts, or the like, within the booster seat structure.

Other component arrangements can be used so that, for example, base portion 12 and side, front or back portions (16, 18 or 14) might be formed from a single piece of material.

Seat section 30 can also be made of any suitable material, but preferably is made of blown polyester fibres, a foam material, or foam material chips, in order to provide a soft, comfortable seat for the pet.

Figure 3:
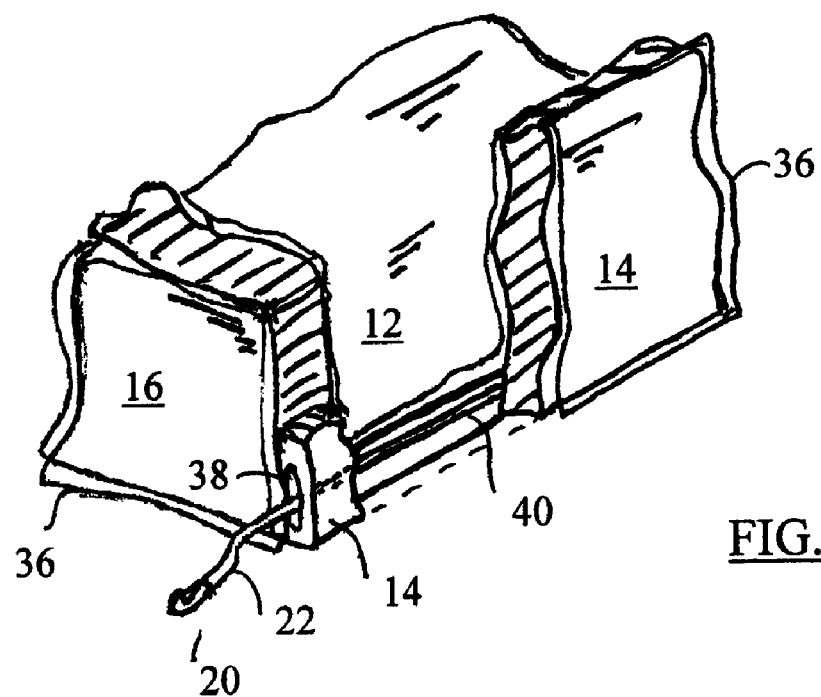
FIG. 3 is an enlarged cut-away view of the lower rear corner of the pet booster seat of FIG. 1.

Additional features of the construction of booster seat 10 can be seen in FIG. 3 which shows in detail the construction of the a lower rear corner of booster seat 10. Parts of seat 10 have been cut-away to better show these details, and seat 30 has been removed.

In FIG. 3, a removable cover 36 of a fabric or plastic material is shown, and which is preferably provided so that it can be removed from the booster seat for cleaning purposes, or for replacement. Cover 36 can be provided as a single piece adapted to be fitted over all of the various portions, including base portion 12, back portion 14, side portions 16 or front portion 18 as a single unit. A zippered closure, an elasticized component, a draw string, or the like, can be provided to facilitate removal and installation of cover 36. Preferably, however, a zippered closure is used to achieve a better fit, and a better overall appearance. Alternatively, two or more separate covers can be provided that will cover various portions of booster seat 10.

One end of strap end 22 is shown and extends from the back of base portion 12, through a slit 38 in cover 36. Strap end 22 is preferably the end of a single strap 40 that extends across the entire back section of base 12, and extends from the opposite side of base portion 12 to form the other strap end 22. As such, both strap ends 22 are preferably the ends of a single strap 40, and that single strap 40 is held securely in place by being located between the glued sections of back portion 14 and either base portion 12 or sides portions 16.

Strap end 22 and/or trigger snap hook 20 can be pushed back beneath cover 36 through slit 38 in order to hide the strap ends and snap hooks when the booster seat is used as a pet bed.

Other arrangements for the connection of the strap ends to the booster seat are possible, such as where each strap end is individually attached to the booster seat and/or the booster seat cover. However, the single strap embodiment is most preferred since it provides the easiest and strongest connection.

Figure 4:
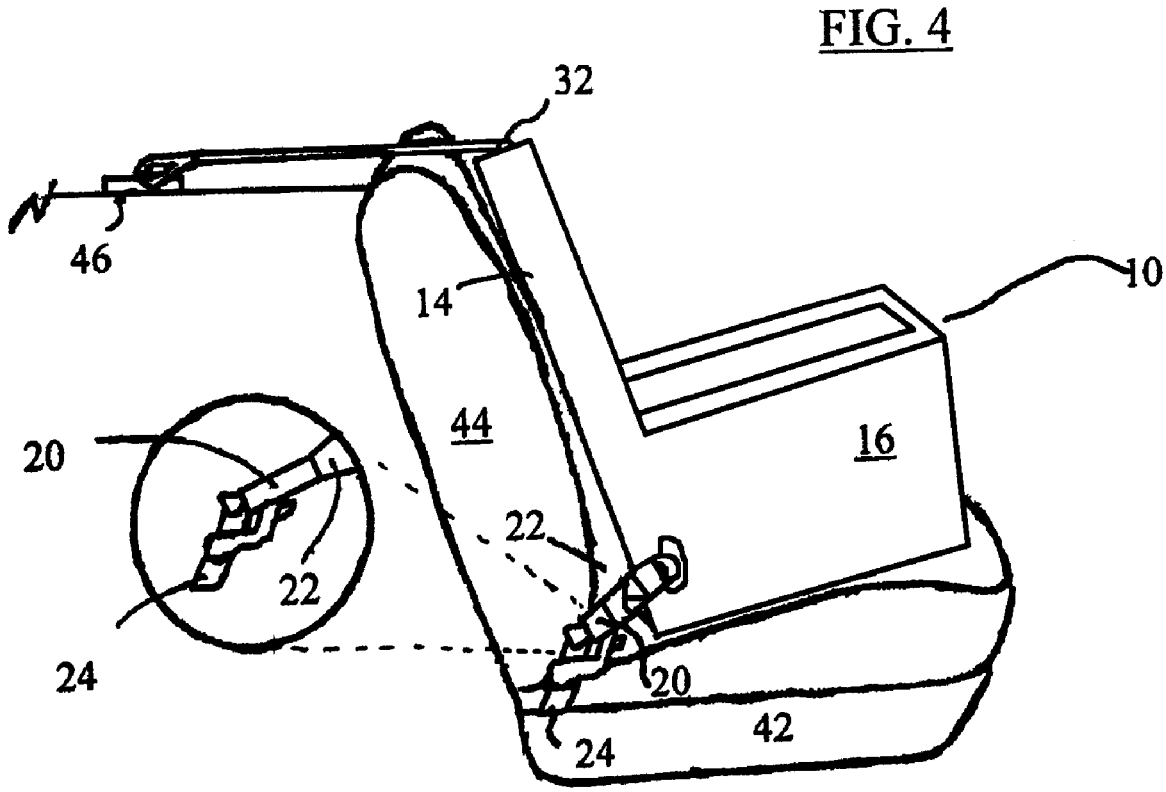
FIG. 4 is a side view of a pet booster seat of the present invention that has been installed in a vehicle.

The booster seat of the present invention is of particular use in the rear bench seats of a vehicle which as the LATCH attachment bracket 24. An installed pet booster seat is shown in FIG. 4, and the details of the LATCH attachment bracket 24 can be more clearly seen in an enlarged view of bracket 24 and snap hook 20. Booster seat 10 is attached to LATCH bracket 24 using an adjustable length strap 22. Further, booster seat 10 is additionally constrained by the use of a tether strap 48 through ring 32. With ring 32 attached by a tether strap 48 to tether attachment point 46, a pet leash or harness can then optionally be attached to ring 32 to confine the pet in the area of the pet booster seat and/or restrain the pet in the event of a sudden deceleration or accident.

While of particular use on a vehicle bench seat, and most preferably, a bench seat located at the rear of the vehicle cabin, the device of the present invention is also useable in a bucket seat having a LATCH attachment bracket.

Figure 5:
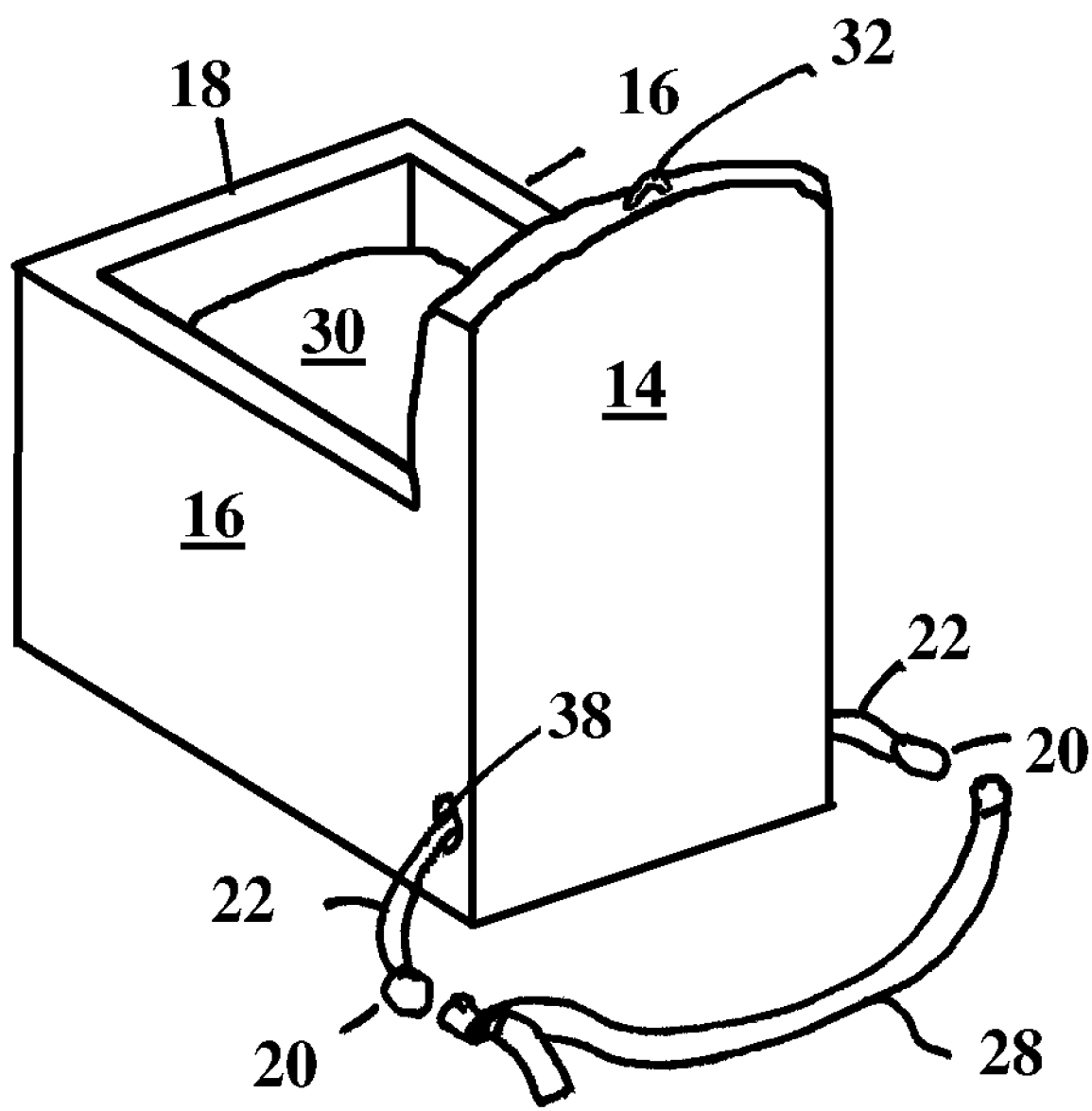
FIG. 5 is a rear perspective view of the pet booster seat of FIG. 1 with an optional second strap attached.

When used in a bucket seat without a LATCH attachment device, however, the booster seat 10 of the present invention can still be used by providing a further, preferably adjustable length strap as seen in FIG. 5, that is adapted to be extended around the bucket seat. The two strap ends 20 can then be attached to the ends of the further strap 28. Any slack in the straps can be removed so that seat 10 is held firmly in position.

When used in a bench seat without a LATCH attachment device, the booster seat 10 of the present invention can still be used in a manner similar to present day devices, by passing the additional strap 28 though or around a deployed seat and/or shoulder belt of the vehicle.

Again, however, in both these non-LATCH based embodiments, booster seat 10 of the present invention is still preferred since it is held in position by strap ends 22 which are located in the rear lower corner of the seat.

It is to be noted that booster seat 10 can be easily installed and removed from a vehicle by releasing snap hooks 20, and tether strap 48, if necessary. Consequently, when traveling, booster seat 10 can easily and quickly be removed from the vehicle and can act as a pet bed for the animal. This will provide a familiar surrounding for the comfort of the pet.

Thus, it is apparent that there has been provided, in accordance with the present invention, a portable pet booster seat which fully satisfies the goals, objects, and advantages set forth hereinbefore. Therefore, having described specific embodiments of the present invention, it will be understood that alternatives, modifications and variations thereof may be suggested to those skilled in the art, and that it is intended that the present specification embrace all such alternatives, modifications and variations as fall within the scope of the appended claims.

Additionally, for clarity and unless otherwise stated, the word "comprise" and variations of the word such as "comprising" and "comprises", when used in the description and claims of the present specification, is not intended to exclude other additives, components, integers or steps.

Moreover, the words "substantially" or "essentially", when used with an adjective or adverb is intended to enhance the scope of the particular characteristic; e.g., substantially planar is intended to mean planar, nearly planar and/or exhibiting characteristics associated with a planar element.

Any use of the relative location words such as upper, lower, back, front or the like, are to be construed when the device is used in its normal operating position.

Further, use of the terms "he", "him", or "his", is not intended to be specifically directed to persons of the masculine gender, and could easily be read as "she", "her", or "hers", respectively.

Also, while this discussion has addressed prior art known to the inventor, it is not an admission that all art discussed is citable against the present application.

I claim:

1. A portable pet booster seat apparatus, comprising:
  a base portion which includes a top surface and a support portion and which rests on a vehicle seat;
  a back wall portion connected to said base portion at a back peripheral portion of said base portion, and wherein said back wall portion projects upward above said top surface of said base portion;
  side and front wall portions connected respectively to said base portion at side and front peripheral portions of said base portion, wherein said side and front wall portions project upward above said top surface of said base portion, and wherein said side portions are connected to both said back portion and said front portion;
  a seat that rests on said base portion, between said back, front and side walls; and
  a seat attachment means which excludes use of a vehicle's seat or shoulder belts, comprising strap ends ending at, or near, said back peripheral portion at the connection of said back portion and said base portion, in the vicinity of said side walls, and LATCH attaching devices located at the end of each strap which devices are each separately connected to vehicle-mounted child seat LATCH attachment brackets which brackets are D-shaped rings firmly attached to the vehicle frame, and located at the base of a vehicle seat back and near each side of said pet booster seat apparatus.

2. A booster seat apparatus as claimed in claim 1 wherein said strap ends are ends of a common strap that extends across said back portion and/or said base portion, and protrude from said base portion or back portion at the lower rear corners of said booster seat apparatus.

3. A booster seat apparatus as claimed in claim 2 wherein said strap ends protrude from the side of the booster seat in the vicinity of the lower rear corner.

4. A booster seat apparatus as claimed in claim 3 wherein the length of said strap ends is adjustable.

5. A booster seat apparatus as claimed in claim 1 wherein said seat is removable.

6. A booster seat apparatus as claimed in claim 5 wherein said seat has a removable cover.

7. A booster seat apparatus as claimed in claim 1 additionally comprising a ring located centrally at the top of said back section, which ring is adapted to receive a pet leash or harness.

8. A booster seat apparatus as claimed in claim 1 wherein each of said base portion, said back portion, said side portions and said front portions are made of a foam material.

9. A booster seat apparatus as claimed in claim 8 wherein said foam material is a polyurethane-based, flexible foam.

10. A booster seat apparatus as claimed in claim 1 wherein said seat is made of a foam material.

11. A booster seat apparatus as claimed in claim 1 wherein said strap ends are nylon straps.

12. A booster seat apparatus as claimed in claim 1 wherein all or a portion of said booster seat apparatus is covered by a removable cover.

13. A booster seat apparatus as claimed in claim 1 additionally comprising a second strap having an adjustable length, and which is adapted to connect the ends of the two strap ends.

* * * * *